United States Patent [19]

Nakamura et al.

[11] Patent Number: 4,742,218

[45] Date of Patent: May 3, 1988

[54] FOCUS ERROR DETECTION APPARATUS UTILIZING FOCUSING AN FRONT AND REAR SIDES OF FOCAL PLANES

[75] Inventors: Shigeru Nakamura, Hachioji; Toshimasa Kamisada, Hiratsuka; Akira Saito, Odawara; Takeshi Maeda, Kokubunji; Yoshito Tsunoda, Mitaka; Toshimitsu Kaku, Sagamihara; Tuyoshi Kato, Hachioji; Masaaki Hishiki, Odawara; Masateru Watanabe, Kanagawa, all of Japan

[73] Assignee: Hitachi, Ltd., Tokyo, Japan

[21] Appl. No.: 828,354

[22] Filed: Feb. 11, 1986

[30] Foreign Application Priority Data

Mar. 11, 1985 [JP] Japan ................................. 60-46554
Mar. 29, 1985 [JP] Japan ................................. 60-63578

[51] Int. Cl.[4] ............................ G01J 1/20; G11B 5/09
[52] U.S. Cl. ...................................... 250/201; 369/45
[58] Field of Search ................ 250/201 AF, 201 DF, 250/204; 369/44, 45, 46

[56] References Cited

U.S. PATENT DOCUMENTS

| 4,460,989 | 7/1984 | Russell | 250/201 |
| 4,622,659 | 11/1986 | Hazel et al. | 369/45 |

Primary Examiner—David C. Nelms
Assistant Examiner—Stephone B. Allen
Attorney, Agent, or Firm—Antonelli, Terry & Wands

[57] ABSTRACT

A focus error detection apparatus and an optical disk apparatus comprising a focusing lens for focusing reflected light coming from a light reflecting surface which is to be adjusted at the focal point of a projected light beam; a beam splitter means for dividing the output light of said focusing lens into a first and a second focused light beam; a first and a second photo-detector disposed respectively on the optical paths of said first and said second focused light beam, one of which is located behind the convergence point of said first focused light beam and the other of which is located before the convergence point of said second focused light beam, each of them generating outputs proportional to the amount of light within a predetermined region of the received light image, when it varies so that it is enlarged; and a circuit generating a focus error signal by using the difference between the outputs of said two photo-detectors.

13 Claims, 9 Drawing Sheets

FOCUS ERROR DETECTION APPARATUS UTILIZING FOCUSING AN FRONT AND REAR SIDES OF FOCAL PLANES

BACKGROUND OF THE INVENTION

This invention relates to a focus error detection apparatus and more in detail to a focus error detection apparatus suitable for a light beam application apparatus, such as optical video disk player, optical audio disk player, or optical digital recording apparatus, in which the focusing position of the illuminating light must follow variations in position of the reflective surface.

In an optical disk apparatus in which a surface of a rotating recording medium is illuminated by laser light and information is optically recorded, reproduced or erased, an auto-focusing servo-system is necessary, which moves an objective lens in the optical head according to the movement of the reflective surface in the optical axis direction taking place in the optical disk, which is rotating, so that the data recording surface is always within the focus depth of the laser spot. The auto-focusing servo-system consists of a servo-motor, e.g. of voice coil type, for moving the objective lens in the optical axis direction, focus error detection optics, and a servo-amplifier for actuating the servo-motor according to focus error thus detected. However, among these elements the focus error detection optics are specifically important and in the case where it is applied to an optical disk apparatus, it is desirable to adopt a construction, in which variations of reflected light due to information pits on the information recording surface, pre-groves forming tracks, etc. don't influence focus error signals. Further, in order to obtain correct focusing control, a device construction is desired, in which, even if displacement in optical axis of the reflected light coming from the information recording surface is produced, e.g., by displacement in position of the optical system, it doesn't influence the focus error signals.

Heretofore, various methods have been proposed for constructing a device for detecting the focus error described above, in one of which the reflected light coming from the information recording surface (reflecting surface) is focused by a lens and a knife-edge is disposed at the convergence point of the light so that only a part of the reflected light reaches a photo-detector located behind the knife-edge (e.g. U.S. Pat. No. 4,450,547). According to this method, it is possible to obtain a semi-circular optical image on the photo-detector, which rotates according to the magnitude of the focus error, by disposing a cylindrical lens between the focusing lens and the knife-edge and to obtain a high precision focus error signal by means of a two-divided photo-detector by using its differential output. However, according to this method, since the focus error signal depends on the relative positional relation between the knife edge and the focused light, there is a problem that variations in position of the knife edge due to thermal expansion and deviations of the optical axis of the reflected light influence the focus error signal. Further, according to another method, as described, e.g., in Japanese Patent unexamined publication No. 84-77637, an optical element for separating the central portion and the peripheral one of the light beam into different directions is disposed on the optical path along which the reflected light is focused and the light beams thus separated are received by separate photo-detectors so that a focus error signal is obtained by using the difference between their outputs. However, since variations in light intensity produced by the information pits and the tracks stated above appear differently for the central and peripheral portions, there remains a problem in this method that noise components are contained in he error signal.

In addition, for an optical disk device using such a focus error detection apparatus, since the information reproduction optical system and the optical system for the focus error detection and the track error detection are separated, there is a problem that the optical head is too big and includes too many parts and that as the results it is too expensive.

SUMMARY OF THE INVENTION

An object of this invention is to provide a focus error detection device, for which variations in intensity of the reflected light depending on the state of the reflecting surface and those in optical axis, as described previously, influence hardly the focus error signal.

Another object of this invention is to provide an optical disk apparatus having a small and inexpensive optical head.

In order to achieve the first object, the focus error detection device according to this invention comprises a focusing lens for focusing the reflected light coming from the reflecting surface on which a projected light beam is to be focused, a means for separating the output light beam of the focusing lens into a first and a second focused light beam, a first and a second photo-detector disposed on the light path of the first and the second focused light beam, respectively, and a circuit for generating a focus error signal at least depending on the difference between the outputs of the two photo-detectors, each of the photo-detectors being disposed on each of the light paths in such a positional relation that variations in magnitude of the received light images of the focused light beams due to focus errors appear in directions opposite to each other, the output stated above being generated proportionally to the light intensity in a certain portion of the received light image for a received light image changed in the enlarging direction.

The positional relation stated above of the photo-detectors is fulfilled, e.g., by disposing the first photo-detector behind the convergence point of the first focused light beam i.e., at the rear side of the focal plane, and the second photo-detector before the convergence point of the second focused light beam i.e., at the front side of the focal plane.

According to this invention, when the light reflecting surface deviates from the focal point, since the received light image is enlarged for one of the two photo-detectors and reduced for the other, the ratio of the light projected outside of the photo-electric transformation region to the total projected light increases and thus the output decreases at the side where the received light image is enlarged, if only a partial region of the received light image is submitted to the photo-electric transformation, e.g., by using a mask having a predetermined opening at the surface of each of the photo-detetctors. To the contrary, at the photo-detector where the received light image is reduced, since the ratio of the light projected within the photo-electric transformation region, the output increases. Consequently, the focus error signal can be obtained by forming the difference between the outputs of the two photo-detectors. In this case, where the reflected light intensity varies due to unevenness of the reflecting surface, since these noise components appear at the same time in the two focused beams, they are compensated by each other and thus influences on the focus error signal are removed.

Further, according to this invention, since the focus error signal and eventually the track error signal can be detected by using the same light beam used also for the reproduction of information, an optical disk device, for which the number of parts is reduced and which has a small and inexpensive optical head, can be realized.

DESCRIPTION OF THE PREFERRED EMBODIMENTS

Figure 1:
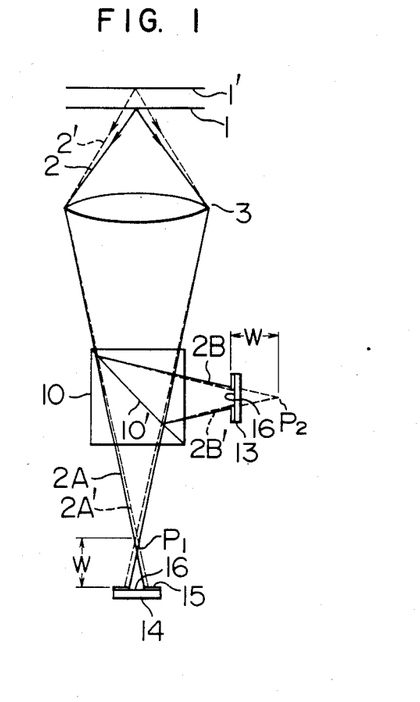
FIG. 1 is a scheme illustrating the construction of an embodiment of focus error detection apparatuses according to this invention.

FIG. 1 is a scheme illustrating the fundamental construction of the apparatus for detecting the position of the focal point according to this invention, in which the reference numeral 1 represents a reflecting surface located at the position of the focal point. To the contrary, 1' shows a situation, where the reflecting surface deviates in position from the position of the focal point so that it becomes farther from the focusing lens, 2 and 2' illustrate the reflected light beams, when the reflecting surface is at each of the positions, respectively. 3 indicates the focusing lens for focusing the reflected light 2 at a point $P_1$ and 10 shows a beam splitter (e.g. half-mirror or polarizing beam splitter) inserted between the focusing lens 3 and the convergence point $P_1$. The reflected light 2 focused by the focusing lens 3 is divided by the beam splitter 10 into two beams, i.e. passing beam 2A and reflective beam 2B, forming convergence points $P_1$ and $P_2$, respectively, which are at a same distance from the dividing surface 10'.

According to this invention, two photo-detectors 13 and 14 are used, one 13 of which is located at the position which is nearer to the beam splitter by a predetermined distance w than the convergence point $P_2$, and to the contrary, the other 14 of the photo-detectors is located at the position which is further therefrom by the predetermined distance w than the convergence pint $P_1$ so that they receive the output light of the beam splitter at their respective positions.

Figure 2A:
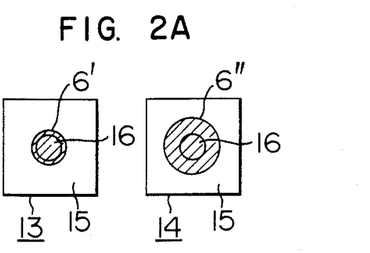
FIGS. 2A, 2B, 2C and 2D are schemes for explaining variations of the received light image on photo-detectors 13, 14 depending on the construction of the photo-detectors used for the embodiment and the position of the convergence points.
Figure 2B:
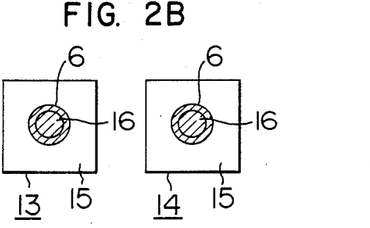
Figure 2C:
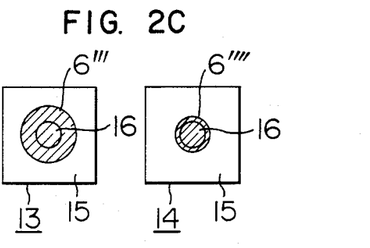
Figure 2D:
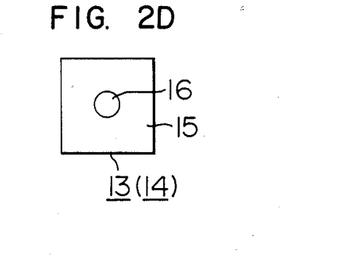

Each of the photo-detectors 13 and 14 is so constructed that except for an effective photo-detector surface 16 at the central portion having a diameter smaller than that of the spot, when focused correctly, as indicated in FIG. 2D, its peripheral portion is covered by a mask 15, and they have a basically same form. When the reflecting surface 1 is well located at the position of the focal point, the two focused light beams 2A and 2B have identical cross-sectional areas at the same distance w from the convergence points $P_1$ and $P_2$, respectively. Received light images (light spots) having a same area are formed on the photo-detectors 13 and 14, as indicated by hatching in FIG. 2B so that their ratios of the light received by the light receiving surface 16 to the total projected light are equal to each other. Consequently, if the beam splitter 10 divides the incident beam into the passing beam 2A and the reflective beam 2B having an identical light intensity, the outputs of the two photo-detectors 13 and 14 are equal to each other, when focused correctly.

Figure 3:
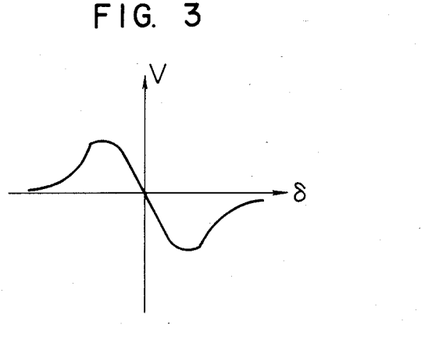
FIG. 3 is a scheme showing an example of characteristics of the focus error signal obtained by the embodiment.

In the construction described above, when the reflecting surface 1 is displaced to the position indicated by 1', the convergence points of the two focused light beams move to positions nearer to the beam splitter than the convergence points $P_1$ and $P_2$ when focused correctly, as indicated by broken lines 2A' and 2B' in FIG. 1. Therefore, on the photo-detector 13, the light spot 6' is reduced, as illustrated in FIG. 2A, so that almost all the projected light is received by the light receiving surface 16, and on the other hand, on the other photo-detector 14 only a part of an enlarged light spot 6'' is received by the light receiving surface 16. In this case, the output of the photo-detector 13 is greater than that of the photo-detector 14 so that the difference between the output signals of the two photo-detectors corresponds to the magnitude of the focus error. In the construction described above, if the reflecting surface is displaced from the position indicated by 1 in such a direction that it becomes nearer to the lens 3, since the light spot 6''' on the photo-detector 13 is enlarged and the light spot 6'''' on the photo-detector 14 is narrowed, as indicated in FIG. 2C, the relation between the outputs of the photo-detectors is reversed. Consequently, the differential output V of the two photo-detectors 13 and 14 shows an S-curved characteristic curve with respect to the magnitude of the focus error δ, as indicated in FIG. 3, and thus it is possible to construct an auto-focusing servo-system by utilizing this property.

Figure 4:
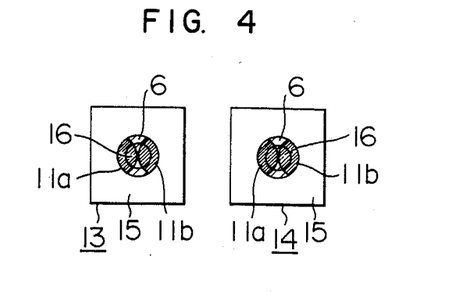
FIG. 4 is a scheme for explaining the received light image on the photo-detectors in the case where 1st order diffraction lights take place in the reflected light for the embodiment mentioned above.

In the construction of the apparatus of the apparatus described above, in the case where, e.g., an optical disk having an information track in the form of a pre-grove is used as the reflecting surface 1, first-order diffractive beams appear in the light spots on the two photo-detetctors 13 and 14, as indicated by 11a and 11b in FIG. 4. When the position of the light spot on the optical disk deviates from the track, the intensity of the first order diffractive beams 11a, 11b stated above varies. However, if the focus error is small, since the variations in intensity appearing in the two photo-detectors 13 and 14 are identical, they are compensated by each their by forming their differential output and therefore there are almost no influences on the focus error detection signal.

Figure 5:
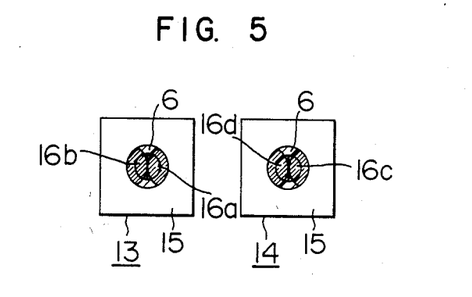
FIG. 5 is a scheme indicating another embodiment for the photo-detectors.
Figure 6:
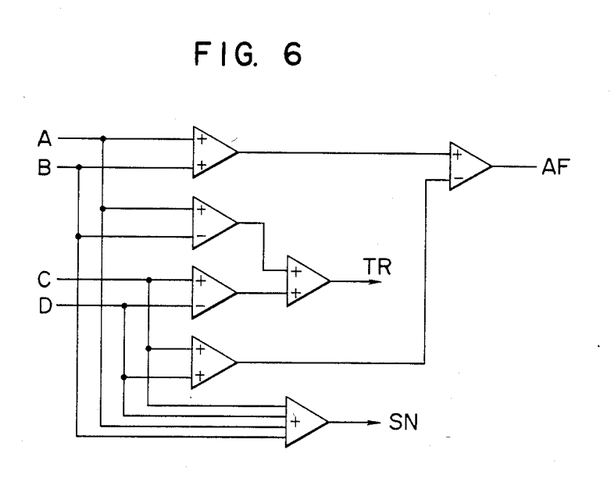
FIG. 6 is a circuit diagram for the output signal of the photo-detectors indicated in FIG. 5.

FIG. 5 shows another embodiment of this invention. In this embodiment, each of the effective surfaces of the photo-detectors 13 and 14 is divided into two parts in such a manner that the first-order diffractive beams 11a, 11b stated above are separated and photo-detection signals A, B, C and D are taken out independently from the four light receiving surfaces 16a, 16b, 16c and 16d, respectively. When independent outputs are taken out in this way from the four light receiving surfaces, the focus error detection signal AF can be obtained by forming $(A+B)-(C+D)$ and the track position detection signal TR by forming $(A-B)+(C-D)$. Furthermore, it is possible to obtain an information signal SN on the track by adding all the outputs. When each of the effective surfaces of the photo-detector is divided in this way into a plurality of regions, the track position detection signal TR can be obtained by using only one photo-detector.

Figure 7A:
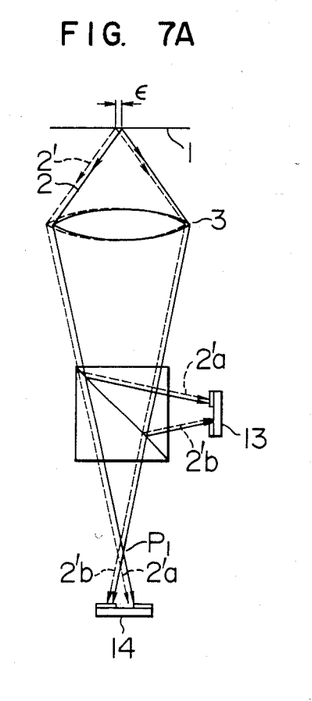
FIGS. 7A and 7B are schemes for explaining the working mode, when deviations of the optical axis in the construction indicated in FIG. 1 take place.
Figure 7B:
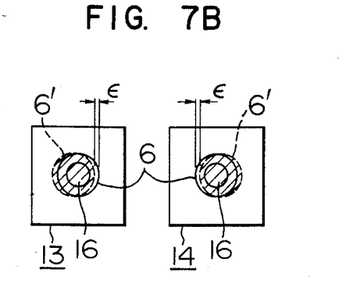

FIGS. 7A and 7B are schemes for explaining the case where the optical axis of the reflected light deviates from the axis of the photo-detectors 13, 14. Such a state can take place, e.g., either when the lens is made to follow an off-centered track on the optical disk or when parts of the optical system are displaced due to temperature variations or to changes with the passage of time. If it is supposed that the light spot is displaced by ε on the reflecting surface 1 and the lens 3 is also displaced by ε in the same direction as the light spot, as indicated in FIG. 7A, the light spot 6 on the photo-detectors 13, 14 is displaced by ε to the position 6' indicated by broken lines, as indicated in FIG. 7B. Even if such a displacement of the received light spot 6 takes place, the outputs of the photo-detectors 13, 14 don't change and thus no errors are produced in the focus error signal AF, if the intensity distribution in the light spot 6 is uniform. Further, even if the intensity distribution in the light spot 6 is not uniform, since the displacement of the light spot 6 appears equally for the two photo-detectors, errors produced in the focus error signal obtained by using the differential output are extremely small.

Figure 8:
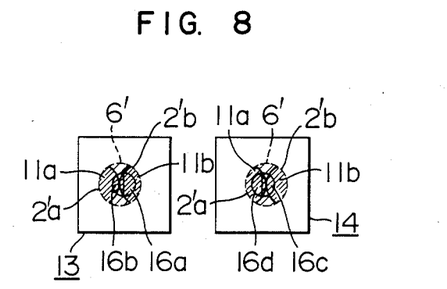
FIG. 8 is a scheme for explaining the received light image, when deviations of the optical axis in the photo-detectors indicated in FIG. 5 take place.

FIG. 8 is a scheme for explaining the light spot on the photo-detectors 13, 14, in the case where deviations of the optical axis of the reflected light described previously take place, when the position of the track is detected by means of a division type photo-detector indicated in FIG. 5. In this case, since the light receiving surface 16a, 16b, 16c and 16d and the position of the first-order diffractive beam 11a, 11b are shifted from each other, the output decreases remarkably in 16b and 16c, where the boundary of the first-order diffractive beam is located. However, since the decrease of the output is almost identical for 16b and 16c, by denoting this value by p, the track position detection signal TR can be represented by $\{A-(B-p)\}+\{(C-p)-D\} = (A-B)+(C-D)$, where p is eliminated. That is, it can be seen that variations of the optical axis don't influence the track position detection signal TR and that even if they do, errors due to them are extremely small.

Figure 9:
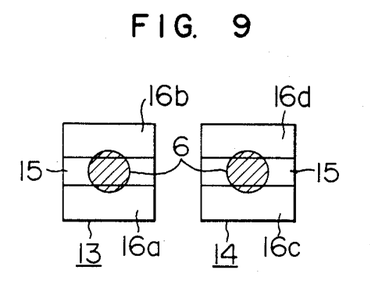
FIG. 9 is a scheme indicating still another embodiment for the photo-detectors.
Figure 10:
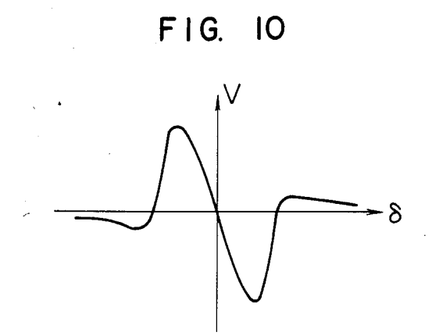
FIG. 10 is a scheme showing the waveform of the output signal obtained by the photo-detectors indicated in FIG. 9.

FIG. 9 shows another embodiment of the photo-detectors 13, 14. In this embodiment, a band-shaped mask 15, the width of which is smaller than the diameter of the light spot 6, when focused correctly, is so disposed that it divides the central portion of the photo-detectors 13, 14 into two parts. The parts of the light receiving surfaces divided into two parts 16a and 16b, and 16c and 16d, respectively, are so constructed that their outputs are approximately equal, when focused correctly. Representing the output of the parts of the light receiving surfaces 16a to 16d by A, B, C and D, respectively, the focus error detection signal AF is given by $(A+B)-(C+D)$. The output V of the error signal with respect to the movement of focusing position δ shows a characteristic curve indicated in FIG. 10.

Figure 11:
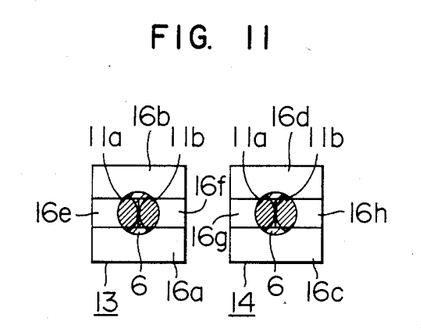
FIG. 11 is a scheme showing an example of variations of the photo-detectors indicated in FIG. 9.
Figure 12:
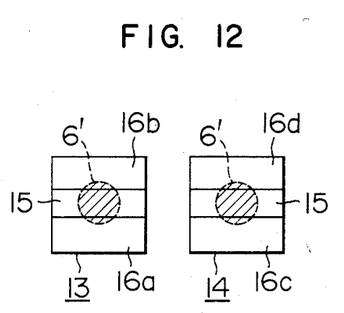
FIG. 12 is a scheme for explaining the working mode of the photo-detectors indicated in FIG. 9.

FIG. 11 shows still another embodiment, where the parts of the light receiving surface divided into two pats 16e and 16f, and 16g and 16h, respectively, are disposed for the detection of the track position at the portion covered by the mask 15 of the photo-detector 13, 14 in the embodiment represented by FIG. 9. Representing the output of the parts 16e-16h by E-H, the track position detection signal TR is given by $(E-F)+(G-H)$. Compared with the embodiment indicated in FIG. 8, since the amount of the first-order diffractive light 11a, 11b received by the parts of the light receiving surfaces 16a-16d for the focus error detection can be reduced, the magnitude of the errors produced by the first-order diffractive lights in the focus error detection signal at the moment of the track passage or the off-track is still smaller than that obtained in the preceding embodiment. In the structure in the embodiment indicated in FIG. 9, where the light receiving surface is divided into two parts 16a, 16b or 16c, 16d, the outputs $(A+B)$ and $(C+D)$ of the photo-detectors 13 and 14, respectively, vary slightly, when the light spots on the photo-detectors move in the upward and downward directions due to deviations of the optical axis of the reflected light, as indicated by 6' in FIG. 12. However, since these variations appear equally in the photo-detectors 13 and 14, denoting their value by q, the focusing position detection signal AF can be represented by $(A+B-q)-(C+D-q)=(A+B)-(C+D)$ and thus the influences of these variations are compensated by each other. For the track position detection signal TR, then influences of the deviations of the optical axis are identical to those mentioned for the first embodiment.

Figure 13:
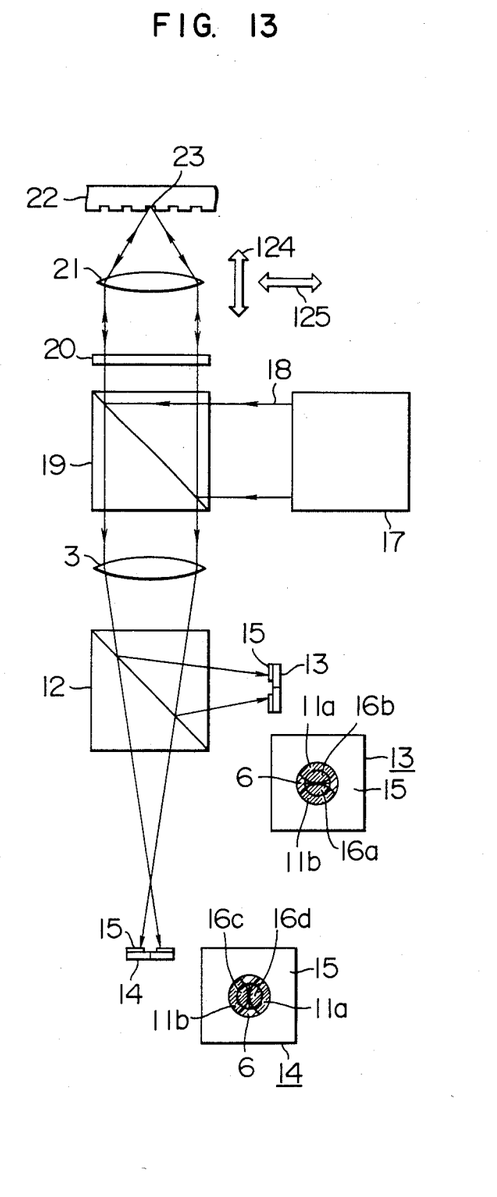
FIGS. 13 and 14 are schemes showing respectively an embodiment of optical disk devices using a focus error detection apparatus according to this invention.

FIG. 13 illustrates another embodiment, in which this invention is applied to an optical disk apparatus. The reference numeral 17 represents an optical beam source consisting of a laser diode and an optical system for transforming laser light to a parallel light flux and the parallel light flux 18 emitted by the apparatus 17 is focused through a polarizing beam splitter 19, a quarter wave plate 20 and an objective lens 21 on the information track 23 (pregroove in which header pits are disposed or series of uneven pits) formed on an optical disk 22. On the optical disk an information recording film is disposed and for the perforation recording it is irradiated with a light beam intensity-modulated according to information to be recorded so that the information is recorded by forming locally perforations in this recording film. The reproduction of the information is performed by using variations in intensity of the light reflected by the optical disk. For the apparatuses exclusively used for reproduction, such as video disk, audio disk, etc., highly reflective film is used and information reproduction is performed by using phase differences in the reflected light due to the uneven pits. The focusing control and the tracking control are necessary both for recording and for reproduction. Light reflected by the optical disk 22 passes through the polarizing beam splitter 19 and is led to the focus error detection apparatus explained, referring to FIG. 1. In this example, a half-mirror type beam splitter is used for the beam splitter 12. In addition, for the photo-detectors 13 and 14 are used those having the construction illustrated in FIG. 5 and the track position detection signal TR is obtained at the same time. Denoting the outputs of the parts of the light receiving surfaces 16a, 16b, 16c and 16d by A, B, C and D, respectively, the focus error detection signal AF, the track position detection signal TR and the information signal SI are given, respectively, by:

$$AF=(A+B)-(C+D), \quad (1)$$

$$TR=(A-B)+(C-D), \text{ and} \quad (2)$$

$$SI=(A+B)+(C+D). \quad (3)$$

The autofocusing and the autotracking can be achieved by moving the lens 21 in the directions indicated by the arrow 124 and by the arrow 125, respectively, according to the signals AF and TR.

Figure 14:
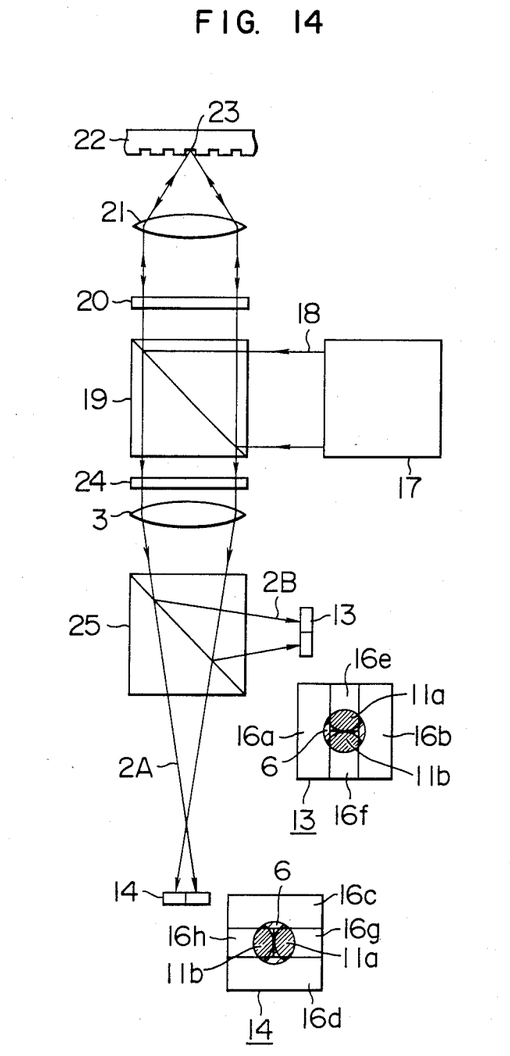

FIG. 14 illustrates still another embodiment, in which this invention is applied to an optical disk. In FIG. 14 the elements corresponding to those in the preceding embodiment are denoted by the same reference numerals. In this embodiment, a quarter wave plate 24 is disposed between the polarizing beam splitter 19 and the lens 3 and a polarizing beam splitter 25 is used instead of the half-mirror type beam splitter 12. When the polarizing beam splitter 25 is used, by changing the mounting angle of the quarter wave plate 24, it is possible to adjust the ratio between the passing beam 2A and the reflective beam 2B and consequently regulation operation for equalizing the amounts of light inputted in the two photo-detectors 13 and 14 is easier. However, this regulation operation for equalizing the amounts of light can be completed by regulating the gain of an amplifier mounted in the output circuit for each of the photo-detectors. In this embodiment, for the photo-detectors 13 and 14, those having the structure indicated in FIG. 11 are used. Denoting the outputs of the parts of the light receiving surfaces 16a, 16b, 16c, 16d for the photo-detector 13 and those of the parts 16e, 16f, 16g, 16h for the photo-detector 14 by A, B, C, D, E, F, G and H, respectively, the focus error detection signal AF, the track position detection signal TR and the information signal SI can be given, respectively, by:

$$AF=(A+B)-(C+D) \quad (4)$$

$$TR=(F-E)+(H-G) \quad (5)$$

$$SI=(A+B+E+F)+(C+D+G+H) \quad (6)$$

Figures 15, 16A, 16B, 17:
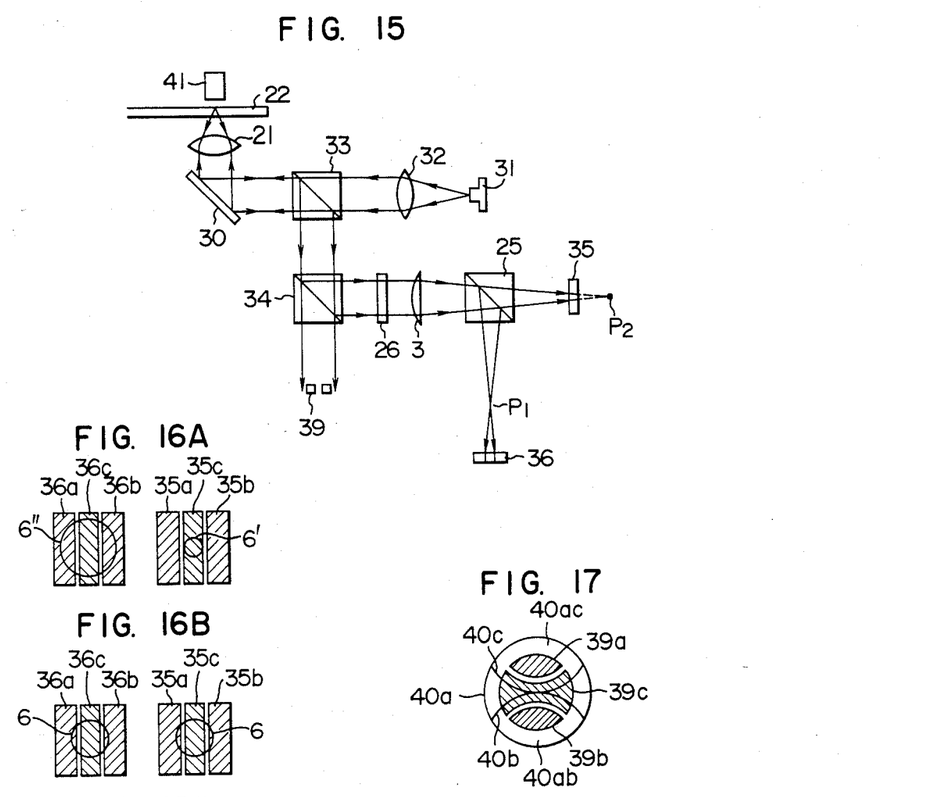
FIG. 15 is a scheme showing an embodiment of magneto-optical disk apparatuses using a focus error detection apparatus according to this invention.
FIGS. 16A, 16B and 16C are schemes for explaining variations of the received light image on photo-detectors 35, 36 depending on the construction of the photo-detectors used for the embodiment indicated in FIG. 15 and the position of the convergence points.
FIG. 17 is a scheme illustrating an example of photo-detectors 39 for the track error detection, which can be used for the embodiment indicated in FIG. 15.

FIG. 15 illustrates an embodiment, in which this invention is applied to a magneto-optical disk apparatus. Laser light emitted by a semiconductor laser device 31 is transformed into a collimated beam by means of a collimating lens 32, which passes through a beam splitter 33 and after having being reflected by a mirror 30, is focused by means of a focusing lens 21 so as to form a laser spot on the surface of the disk 22. In the case where a semiconductor laser emitting laser light having an anisotropic light intensity distribution is used, it is necessary to dispose an optical element for shaping the beam intensity distribution, e.g. a triangular prism in the optical path between the collimating lens 32 and the beam splitter 33 (e.g. polarizing beam splitter). The reflected light coming from the disk is transformed again by the focusing lens 21 into a collimated beam, which is reflected by a mirror 30 and reflected again by the beam splitter 33. A part of the reflected beam is reflected still again by another beam splitter 34 and led to an optical system for the focus error detection and the information reproduction consisting of a half wave plate 26, a focusing lens 3, a polarizing beam splitter 25 and two photo-detectors 35 and 36.

Figure 16C:
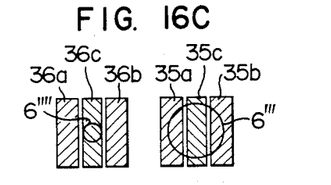

At first, the principle for the focus error detection will be described. The polarization direction of the incident beam to the polarizing beam splitter 25 can rotate by about 45° with respect to the direction of S polarization or to the direction of P polarization of the reflecting film of the polarizing beam splitter 25 by rotating the half wave plate 26 for adjustment and the incident beam is divided by the polarizing beam splitter 25 into two beams having approximately equal amounts of light. In the correct focus state, where the irradiation light spot is on the surface of the disk 22, a photo-detector 35 is disposed between the position of a convergence point $P_2$ formed by the focusing lens 3 and the polarizing beam splitter 25 and another photo-detector 36 is located at the opposite side of the other convergence point $P_1$ from the polarizing beam splitter 25. This distance between the convergence point $P_2$ and the photo-detector 35 is approximately equal to that between the convergence point $P_1$ and the photo-detector 36. The hatched portions 36a, 36b and 36c in FIGS. 16 A, 16B and 16C show the shape of divided photo-detector elements of the photo-detector 36 and the hatched portions 35a, 35b and 35c show the shape of divided photo detector elements of the photo-detector 35. The circles 6 in FIG. 16B show the shape of the light flux on the light receiving surface of the photo-detectors 35 and 36, respectively. In the correct focus state as stated above, they are approximately equally great. When the disk 22 approaches the focusing lens 21, since the convergence point $P_1$ becomes closer to the photo-detector 36, the light spot 6'''' on the light receiving surface becomes smaller, as indicated in FIG. 16C, and since the convergence point $P_2$ becomes farther from the photo-detector 35, the light spot 6''' on the light receiving surface becomes greater. To the contrary, when the disk 22 becomes more distant from the focusing lens 21, the light spot 6" becomes greater and the light spot 6' becomes smaller. Therefore, by forming the difference between the sum of the outputs of the divided photo-detector elements 36a and 36b and the sum of the outputs of the divided photo-detector elements 35a and 36b, it is possible to obtain the focus error detection signal AF. Further, also by forming the difference between the divided photo-detector elements 36C and 35C, it is possible to obtain the focus error detection signal AF.

Figure 18A:
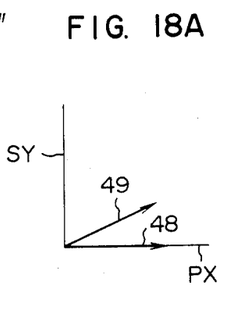
FIGS. 18A and 18B are schemes for explaining the principle of the reproduction of information by the magneto-optical effect.
Figure 18B:
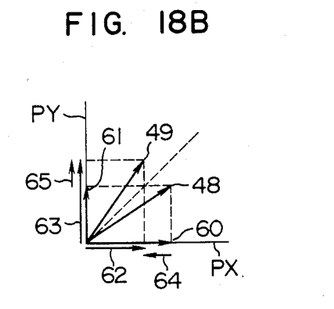

Next, the magnetized information reproduction signal can be obtained by forming the difference between the sum of the outputs of the divided photo-detector elements 36a, 36b and 36c and the sum of the outputs of the divided photo-detector elements 35a, 35b and 35c. FIGS. 18A and 18B are schemes for explaining the principle of the magnetized information reproduction. The abscissa PX indicates the direction of P polarization and the ordinate SY the direction of S polarization for the reflecting surface of the polarizing beam splitter 25 indicated in FIG. 15. A perpendicular magnetic thin film is disposed on the surface of the disk 22 and information is recorded by reversing the magnetization direction in this perpendicular magnetic thin film. When a laser spot is projected on this magnetic film, the polarization direction of the reflected light rotates by about 0.5 degree by the magneto-optical effect (Kerr effect) depending on the reverse of the magnetization direction. The magneto-optical disk apparatus detects this extremely small rotation of the polarization direction and performs the reproduction of the information. FIG. 18A shows the polarization direction of the light before the incidence to the half wave plate 26 indicated in FIG. 15, where the arrow 48 indicates the polarization direction of the light in the case where the light spot is projected in the portion of the magnetic film, where no information is recorded on the disk 22. When the light spot passes to the portion where information is recorded, the polarization direction rotates as indicated by the arrow 49. FIG. 18B indicates the polarization direction of the light which has passed through the half wave plate 26. Since the polarization direction can be rotated by about 45 degrees by regulating the rotation of the half wave plate, the direction of the arrows 48 and 49 is rotated by about 45 degrees with respect to that indicated in FIG. 18A. Since the polarization beam splitter 25 has a property that the P polarized light indicated by the abscissa PX passes therethrough and the S polarized light indicated by the ordinate SY is reflected, when the light spot is located in the portion of the magnetic film, where no information is recorded, in the polarized light indicated by the arrow 48, the amount of light indicated by the arrow 60 passes through the polarizing beam splitter 25 and is received by the photo-detector 35; to the contrary the amount of light indicated by the arrow 61 is reflected by the polarizing beam splitter 25 and received by the photo-detector 36. On the other hand, when the light spot is located in the portion of the magnetic film, where information is recorded, in the polarized light indicated by the arrow 49, the amount of light indicated by the arrow 62 is received by the photo-detector 35 and the amount of light indicated by the arrow 63 is received by the photo-detector 36. Consequently, the magnetized information reproduction signal can be obtained by forming the difference between the amounts of light received by the photo-detectors, respectively, depending on the presence or absence of the recorded information, because the amount of light received by the photo-detector 35 decreases by that indicated by the arrow 64 and the amount of light received by the photo-detector 36 increases by that indicated by the arrow 65.

Since there are common parts in the operations of the outputs of the divided photo-detector elements for obtaining the focus error signal and the information reproduction signal, problems concerning mutual interference between the signals can take place. However, taking into account the fact that the frequency of the information reproduction signal is several Megaherz, because the interval of the information recording is several $\mu$m, while the variable frequency of the focus error signal is several hundreds of Herz, because the number of rotation of the disk is several tens of Herz, the two signals can be satisfactorily separated, e.g., by using a filter circuit and thus there is no problem.

Figure 19:
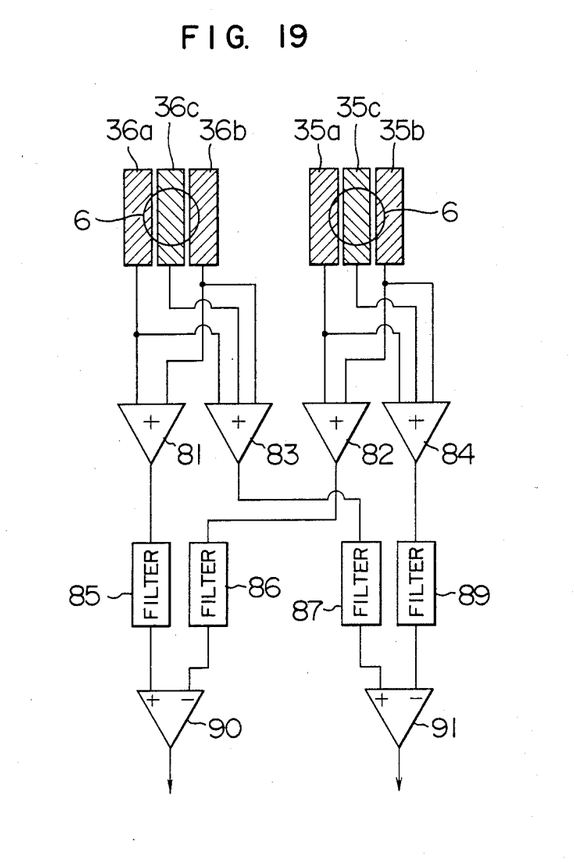
FIG. 19 is a circuit diagram for the output signal of the photo-detectors 35, 36 indicated in FIG. 15.

For example, as indicated in FIG. 19, the outputs of the divided photo-detector elements 36a and 36b are added in an adding circuit 81 and the outputs of the divided photo-detector elements 35a and 35b are added in an adding circuit 82. Then, the focus error detection signal can be obtained by forming the difference between the outputs of the adding circuits 81 and 82, which have passed through low pass filters 85 and 86, respectively, whose cut-off frequency is, e.g., 1 kHz in an adding circuit 90. Furthermore, the outputs of the divided photo-detector elements 36a, 36b and 36c are added in an adding circuit 83 and the outputs of the photo-detector elements 35a, 35b and 35c are added in an adding circuit 84. Then, the information reproduction signal can be obtained by forming the difference between the outputs of the adding circuits 83 and 84, which have passed through high pass filters 87 and 88, respectively, whose cut-off frequency is, e.g., 100 kHz, in a differential circuit 91.

The photo-detector 39 is a detector, which detects deviations of the light spot from the track on the surface of the disk, and has, e.g., divided photo-detector elements 39a, 39b and 39c, hatched in FIG. 17. The principle of the track error detection is described in detail in U.S. Pat. No. 4,525,826 and therefore explanation therefor is omitted. The pattern of the light flux on the light receiving surface of the photo-detector 39 is constructed by interference between 0th order diffractive beam 40a and ± 1st order diffractive beams 40b and 40c. Since light intensities in interference areas 40ab and 40ac vary depending on the deviations from the track, the track error signal TR can be obtained by forming the difference between the outputs of the photo-detectors 39a and 39b located in the interference areas 40ab and 40ac, respectively.

In addition, an electro-magnet 41 is used, which produces an external magnetic field applied to the magnetization film on the disk 22, in order to record or erase information. Further, the optical head consisting of the optical element described above and the electro-magnet 41 are mounted, e.g., on a moving base so that they are movable in a radial direction of the disk 22 and located at a desired track position by means of a driving motor, such as linear motor, etc. Furthermore, the tracking control is effected by using, e.g., a rotating mirror as the mirror 30 and the tracking signal TR detected from the output of the photo-detector 39 representing deviations of this rotating mirror.

On the other hand, the autofocusing control is effected, e.g., by disposing an actuator such as voice coils, etc. around the focusing lens 21, driving this actuator depending on the focus error detection signal AF detected from the outputs of the photo-detectors 35 and 36, and moving the focusing lens 21 along the optical axis. Further, it is also possible that the tracking control and the autofocusing control can be effected at the same time by disposing a two-dimensional actuator around the focusing lens 21, which is movable also in a radial direction of the disk and driving this actuator depending on the tracking signal TR and the focus error detection signal AF.

In the embodiment shown in FIG. 15 the track error detection signal is obtained by using the photo-detector 39 of exclusive use, but the diffraction interference pattern due to the track is produced also in the light flux 6 in FIG. 16B. Consequently, when divided photo-detector elements are formed symmetrically in the region of the interference of the 0th order diffraction beam and the ±1st order diffraction beam within the central photo-detector elements 35c and 36c of the photo-detectors 35 and 36, respectively, the track error signal can be obtained also by forming the difference between their outputs. Therefore, the beam splitter 34 and the photo-detector 39 can be omitted in this way.

Figure 20:
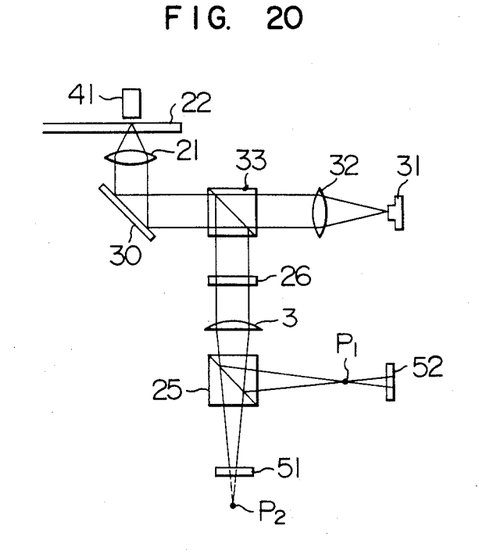
FIG. 20 is a scheme showing another embodiment of magneto-optical disk apparatuses using a focus error detection apparatus according to this invention.
Figure 21A:
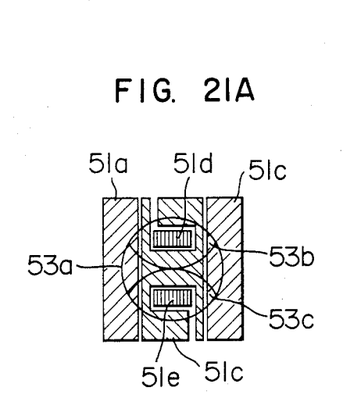
FIGS. 21A and 21B are schemes showing the construction of the photo-detectors 51, 52 used for the embodiment indicated in FIG. 20.
Figure 21B:
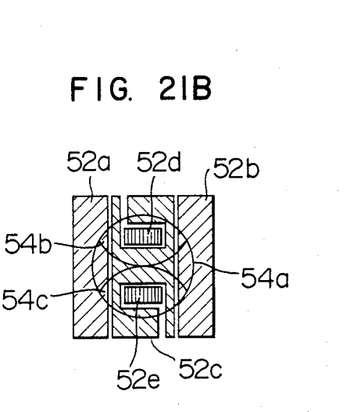

FIG. 20 is a scheme showing another embodiment of this invention, for which the embodiment indicated in FIG. 15 is ameliorated on the basis of the idea described above. The photo-detector 51 has divided photo-detector elements indicated by hatched parts 51a, 51b, 51c, 51d and 51e in FIG. 21A and the photo-detector 52 has divided photo-detector elements indicated by hatched parts 52a, 52b, 52c, 52d and 52e. Since the function of the other constructional parts in FIG. 20 is identical to that in FIG. 15, their explanation is omitted. The focus error detection signal AF can be obtained by forming the difference between the sum of the outputs of the divided photo-detector elements 51a and 51c and the sum of the outputs of the divided photo-detector elements 52a and 52b. The track error detection signal TF can be obtained by forming the difference between the outputs of the divided photo-detector elements 51d and 51e located in the region of interference of the 0th order diffraction beam 53a and the ±1st order diffraction beams 53b and 53c or by forming the difference between the outputs of the elements 52d and 52e located in the region of interference of the 0th order diffraction beam 54a and the ±1st order diffraction beam 54b and 54c, or by adding the two results of subtraction stated above. Furthermore, the information reproduction signal can be obtained by forming the difference between the total output of the photo-detector 51 and that of the photo-detector 52.

In addition, the tracking control and the autofocusing control can be effected in the same manner as for the embodiment indicated in FIG. 15.

It is evident that the optical head according to the embodiments indicated in FIGS. 15 and 20 is not limited to that in which information reproduction is effected by the magneto-optical effect, but it is also possible to reproduce information recorded by adding the total outputs of the photo-detector 35 and those of the photo-detector 36 indicated in FIG. 15, by adding the total outputs of the photo-detector 51 and those of the photo-detector 52 indicated in FIG. 20, or by the uneven pit type, the hole type or the crystal phase change type recording.

In the above, some preferred embodiments have been described, but in the realization of this invention, for the form of the effective light receiving surface of the photo-detector, various modifications other than the forms indicated in the above mentioned embodiments are possible and any form can be used, for which the size of the light spot projected on the photo-detector varies depending on the magnitude of the focus error and only a predetermined part of the light spot is reflected on the received light signal. Further, although two photo-detectors 13, 14 or 35, 36 or 51, 52 are located at positions, which are equally distant by w from the convergence points in the embodiments described above, their positions can be regulated, depending on the amount of light of the passing beam 2A and that of the reflective beam 2B. Furthermore, it is also possible that the passing beam 2A is received before the convergence point and the reflective beam 2B is received behind the convergence point, the two photo-detectors being replaced mutually in the positional relation, and that the light receiving surfaces of the two photo-detectors have different areas, depending on the characteristics of the beam splitter 12, 25.

As it is evident from the above explanation, according to this invention, since light coming from the reflecting surface which is to be adjusted at the focal point of a projected light beam is divided into two beams which are directed in two directions; photo-detectors are disposed on the optical paths of the divided light beams in such a positional relation that variations in size of the received light images (spots) due to focus errors appear in directions opposite to each other; each of the photo-detectors transform always only a part of light of each of the received light images; and the difference between the outputs of the two photo-detectors described above is used as a focus error detection signal, even if variations in the reflected light are produced by variation in the form of the reflecting surface, it is possible to obtain a focus error detection signal, which is influenced only slightly by these variations.

Further, since the focus error signal can be detected by using a same light flux as for the information reproduction, the number of optical parts constituting an optical head and thus it is possible to realize a small, light and inexpensive optical head.

We claim:

1. A focus error detection apparatus comprising:
   optical means for dividing a light coming from a light reflecting source into first and second focused light beams;
   first and second photo-detectors disposed respectively on optical paths of said first and said second focused light in such a positional relation that variation in size of received light images of said focused light beams due to focus error appear in directions opposite to each other; and
   circuit means for generating a focus error signal at least depending on the difference between outputs of said first and second photo-detectors;
   wherein each of said first and second photo-detectors is divided into a first region receiving a central portion of said received light image, a second region and a third region located separately at opposite sides of said first region and receiving peripheral portions of said received light image, each of said first and second photo-detectors having at least two photoelectric transformation portions disposed respectively within said second and third regions, and said circuit means generating said focus error signal on the basis of the outputs of said photoelectric transformation portions.

2. A focus error detection apparatus according to claim 1, wherein each of said first and second photo-detectors has a light preventing structure within said first region.

3. A focus error detection apparatus according to claim 1, wherein said first photo-detector is disposed one of at a front and rear side of a focal plane of said first focused light beam and said second photo-detector is disposed at the other of a front and rear side of a focal plane of said second focused light beam.

4. A focus error detection apparatus according to claim 1, wherein at least one of said first and second photo-detectors has a photoelectric transformation portion divided at least into two parts within said first region, and said circuit means generates a control signal for making the position of a projected light beam on said reflecting surface follow a predetermined track on the basis of outputs of said two parts of said first region.

5. A focus error detection apparatus according to claim 4, wherein each of said two parts of said first region is disposed within a region of interference of an 0th order diffraction beam and a 1st order diffraction beam. first focused light beam and said second photo-detector is disposed at the other of a front and rear side of a focal plane of said second focused light beam.

6. An optical disk apparatus comprising:
a disk-shaped recording carrier;
an optical head provided at least with an optical system for focusing a light beam on said disk-shaped carrier and a detection system for detecting a reflected light coming from said disk-shaped carrier, said detection system including optical means for dividing said reflected light into first and second focused reflected light beams, and first and second photo-detectors disposed respectively on optical paths of said first and second focused reflected light beams in such a positional relation that variation in size of received light images of said focused reflected light beams due to focus error appear in directions opposite to each other; and
circuit means connected to said first and said second photo-detectors for generating a focus error signal which controls said light beam so that it is focused on said recording carrier, said circuit means generating also an information reproduction signal for reproducing information recorded on said recording carrier;
wherein each of said first and second photo-detectors has a first photo-electric transformation portion receiving a central portion of said received light image, second and third photoelectric transformation portion located separately at opposite sides of said first photoelectric transformation portion and receiving peripheral portions of said received light image, and said cirucit means generates said focus error signal on the basis of outputs of said second and third photoelectric transformation portions, and generates said information reproduction signal on the basis of the outputs of said first, second and third photoelectric transformation portions.

7. An optical disk apparatus according to claim 6, wherein said detection system further comprises a third photo-detector for receiving light reflected by said recording carrier, said third photo-detector being divided at least into two parts for detecting a track error signal which controls the light beam so that the light beam follows a predetermined track on said recording carrier; and means for dividing said reflected light into two beams and for leading one of said two beams to said optical means and the other of said two beams to said third photo-detector.

8. An optical disk apparatus according to claim 6, wherein said circuit means generates said information reproduction signal by summing the total outputs of said first and said second photo-detectors.

9. An optical disk apparatus according to claim 6, wherein said circuit means generates said focus error signal depending on the difference between the total outputs of said first photo-detector and the total outputs of said second photo-detector.

10. An optical disk apparatus according to claim 6, wherein said optical means includes a half wave plate and a polarizing beam splitter.

11. An optical disk apparatus according to claim 6, wherein said first photo-detector is disposed one of at a front and rear side of a focal plane of said first focused reflected light beam and said second photo-detector is disposed at the other of a front and rear side of a focal plane of said second focused reflected light beam.

12. An optical disk apparatus according to claim 6, wherein at least one of said first and said second photo-detectors has said first photoelectric transformation portion divided at least into two parts, and said circuit means generates a track error signal for making the light beam follow a predetermined track on said recording carrier depending on the outputs of said two parts of said first photoelectric transformation portion.

13. An optical disk apparatus according to claim 12, wherein each of said two parts of said first photo-electric transformation portion is disposed within a region of interferenece of an 0th order diffraction beam and a 1st order diffraction beam.

* * * * *